Patented Sept. 23, 1952

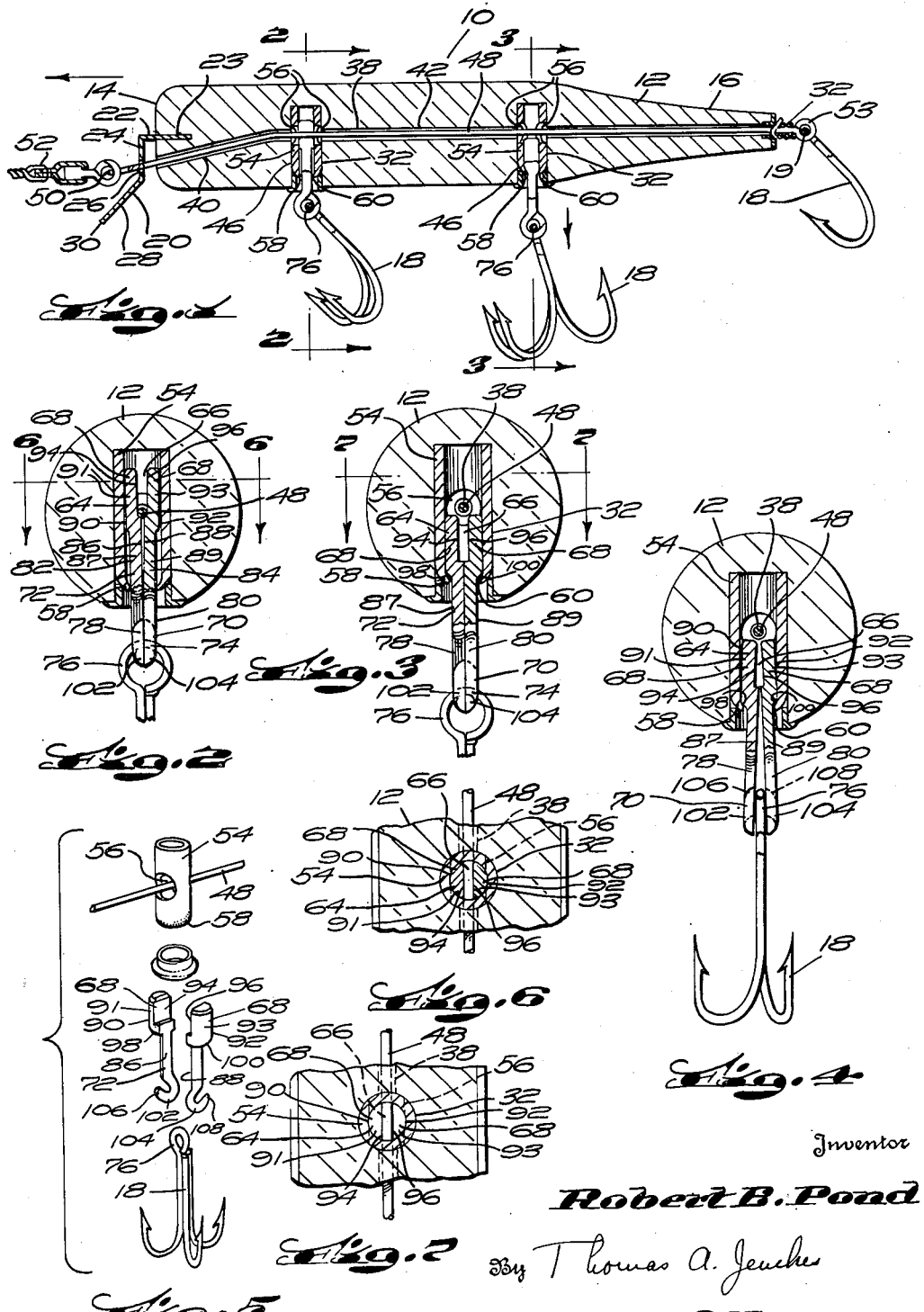

2,611,209

UNITED STATES PATENT OFFICE 2,611,209

FISHING LURE

Robert B. Pond, Attleboro, Mass.

Application February 20, 1948, Serial No. 9,766

8 Claims. (Cl. 43—42.44)

My invention relates to improvements in artificial baits or lures.

The main object of my invention is to provide a swivelling hook mounting means which can be locked in a non-swivelling position by the fisherman while the bait is being cast and retrieved and which can, by the action of the fish striking the lure and the subsequent setting of the hook in the fish's mouth by the action of the fisherman in fishing, be moved into a swivelling position.

A further object of my invention is to provide a fish hook mounting means to which single, double or triple hooks may readily be attached or removed. With this view in mind, it can readily be seen, that while a swivel mounting means is essential for large fish, only triple hooks can be used with a non-locking swivel, but with my improved means for unlocking the swivelling means, single or double hooks can also be used.

A further object of my invention, therefore, is to provide preferably in combination with the fish hook replacement mounting means hitherto referred to, means for swively mounting said mounting means for said fish hook in a pendant position on said lure and means to lock said swivelling means in a non-swivelling position. With this construction, it is obvious that my invention may be employed with triple hooks which always have a prong in position to pierce a fish's jaw and are, therefore, preferably swively mounted and may also be employed with single or double hooks when locked in a non-swivelling position so as to be sure that even when drawing in after casting, the fish hook will be in position to pierce the fish's jaw and not in an inoperable position close to the lure.

These and such other objects of my invention as may hereinafter appear will be best understood from a description of the accompanying drawings which illustrate an embodiment thereof.

In the drawings,

Fig. 1 is a vertical sectional view taken through a fishing lure equipped with my improved mounting means, illustrating one such means locked in non-swivelling position mounting a double hook fish hook on the front thereof and a similar mounting means mounting a triple hook movable by a striking fish to a swivelling position, showing the fish hooks and part of the mounting means in elevation.

Fig. 2 is a vertical transverse sectional view taken along the line 2—2 of Fig. 1, showing the parts of my improved mounting means locked in non-swivelling position.

Fig. 3 is a vertical sectional view similar to Fig. 2 and taken along the line 3—3 of Fig. 1 of the same parts of the mounting means after they have been moved from a locked, non-swivelling position to a swivelling position.

Fig. 4 is a vertical sectional view similar to Fig. 2 illustrating how the split sections of my improved mounting means may have the hook portions thereof tilted outwardly for the insertion and removal of a fish hook eye therefrom.

Fig. 5 is a disassembled perspective of the parts of my improved mounting means.

Fig. 6 is a transverse horizontal sectional view taken along the line 6—6 of Fig. 2.

Fig. 7 is a transverse horizontal sectional view taken along the line 7—7 of Fig. 3.

In the drawings, wherein like characters of reference generally indicate like parts throughout, 10 generally indicates a fishing lure equipped with my invention. In certain respects my invention is an improvement on the construction shown in my prior application for patent on Fishing Plug, S. N. 742,171, filed April 17, 1947, and my invention broadly relates to improvements in the specific construction of the means for swively mounting a fish hook on the lure shown therein.

Broadly my invention comprises in combination in a fishing lure, a fish hook, means to swively mount said fish hook in a pendant position on said lure and means to lock said swivelling means in a non-swivelling position with the locking means so light that it may be automatically releasable by a striking fish to a position permitting swivelling of said fish hook.

My invention also comprises, as stated, the combination with said mounting means with means to replace fish hooks thereon either for the purpose of replacing worn out or broken hooks or for changing the type of hooks employed.

My invention specifically relates to the specific structure which permits said means to function together and with the parts of the mounting means so specifically designed as to permit the swivel to lock in a non-swivelling position. In general, I construct my improved fishing lure 10 in similar manner as described in said patent of a fish simulating shape and for this purpose provide it with the elongated generally cylindrical fish simulating body 12, having a preferably round or semi-spherical nose 14 and a tapered rear end 16. Suitable, preferably multi-pronged hooks, as shown, are mounted at equally spaced distances on the plug, comprising the two hooks 18 and 18 depending from the body thereof and the hook 18 depending from the rear end thereof, said hooks 18 and 18 being preferably mounted on said plug 10 in a manner to be described.

In the preferred embodiment shown, said plug is provided with the face plate 20 to make it twist and swivel and to aid in causing a commotion when the plug is pulled in inverted position through the water, although my present invention may be employed on a lure or plug not having these peculiar characteristics. In the preferred embodiment shown, said plate 20 comprises the preferably flat face plate of at least the width of the plug having a forwardly projecting portion 22 having its rear end imbedded in a horizontal slot 23 substantially centrally of the nose 14 of the plug to have the portion 22 project first forwardly horizontally substantially centrally of the nose and a portion 24 projecting downwardly therefrom preferably having a hole 26 therein, said portion 24 terminating in the tip portion 28, having a semi-circular lower edge 30 extending obliquely forwardly and downwardly from said downwardly projecting portion 24.

My invention also specifically relates to the specific type of mounting means 32 which I employ for mounting the hooks 18 so they may depend from the lower portion of the plug. For this purpose I provide the plug body 12 with the central axial hole 38 extending from the lower portion of the nose 14 upwardly as at 40, then rearwardly centrally of said body as at 42 to the rear end 16 thereof. I provide the vertical holes 46 projecting downwardly from said central axial hole 48 to the lower surface of said body, which holes 46 in the embodiment shown extend upwardly beyond said axial hole 38.

I provide the draw wire 48 extending through said face plate hole 26 when the face plate 20 is employed and the central axial hole 38 of the plug having a front end shaped in the form of a line attaching loop 50 to which the line 52 is attached in front of the downwardly projecting portion 24 of said fish plate and a rear end having a vertical hook attaching loop 53 thereon. The rear fish hook has its eye 19 mounted on said vertical loop 53. To maintain the centrally depending multipronged fish hooks 18 in their respective holes 46, I provide the hollow cylindrical barrels 54 mounted with a loose slip fit in the embodiment shown in said vertical holes 46, being provided with the diametric holes 56 in the upper ends thereof through which the draw wire 48 is strung. Said barrels are provided with the inwardly domed lower edges 58, having the open central portions 60.

Much of the construction hitherto described is similar to that shown and described in my prior application. In place of the cotter hooks having outwardly flaring upper ends extending through the narrow open portions 60 of said swivel barrels 54 and resting on the domed edges thereof forming the supporting lips, so that the eye portions for mounting the fish hook eyes thereon depend from the lower surface of said plug, I preferably construct my improved mounting means as follows: I provide said mounting means 32 with a cylindrical upper portion 64 of less length than the distance between the lower ends of said barrels and said draw wire 48 swivelly mounted within the lower portions of said barrels each having the central diametric groove 66 providing the two spaced resilient arms 68 upstanding from each side of said groove 66 and having fish hook supporting eye means 70 projecting downwardly therefrom through said open lower domed end of said barrel whereby when said upper portion 64 of said fish hook mounting means is moved upwardly said arms 68 may engage said draw wire 48 within the channels 66 thereof to prevent rotation of said fish hook mounting means 32 within said barrels 54. The mounting means 32 are also provided with the shank portions 72 vertically slidable through said open central holes 60 in the lower domed ends 58 of the barrels. It is obvious that this structure so far described provides a structure such as shown in 32 in which the portion 64 thereof may readily swivel within the lower end of the barrel below the draw wire 48 but which may be readily locked in the closed position shown at 32ª when a said upper portion 64 is pushed axially upwardly within said barrel 54 to cause said draw wire 48 to come within the channel 66 to spread said upper arm portions 68 in the manner shown in Fig. 2. If desired, in place of the diametric holes 56, a single hole may be provided and a separate projection from the inner end of each hole 46 may be provided in place of the draw wire, although it is obvious that the draw wire itself forms such a projection fitting through a suitable hole in the barrel for this purpose.

While any suitable type of eye means 74 may be provided for holding the eye 76 of the fish hook 18, so far as the features of construction hitherto described are concerned in my preferred embodiment I preferably provide said eye means 74 with two oppositely disposed hooks 78 and 80 projecting from said lure, preferably from the split shank portion 72 thereof, urged by the fish hook eye 76 mounted thereon to a closed position supporting said fish hook and separable for insertion or removal of the fish hook eye 76.

In my preferred embodiment, I have specifically constructed my mounting means so that it may normally swivel, but also have provided means to lock it in non-swivelling position and I also preferably construct my improved mounting means with the oppositely disposed split hooks 78 and 80 forming the eyes 74 for attachment or removal of different hooks and I preferably so modify the parts of the mounting means 32 that they may perform both said functions.

Said mounting means 32 comprises the split hemi-cylindrical portions 82 and 84 having flat diametric inner surfaces 86 and 88 and hemi-cylindrical outer surfaces 90 and 92 each having an enlarged cylindrical upper locking clutch plate head portion 91 and 93, forming the portion 64 of the barrel below the draw wire 48 movable from the lower end 60 to a position further within said barrel 54 of the internal radius of the barrel having a diametrically cutaway portion 94 and 96 centrally of the upper end portions 91 and 93 thereof substantially throughout the height thereof, providing the channel 66, an intermediate shank portion 87 and 89 of less radius projecting downwardly through the opening 60 in the lower domed end 58 of the barrel forming the respective shoulders 98 and 100 between said upper portions 91 and 93 and said intermediate shank portions 87 and 89 and a point forming hook 78 and 80 on the lower respective ends thereof, said hemi-cylindrical head portions 91 and 93 in use having their flat diametric inner surfaces 86 and 88 abutting to substantially provide a cylinder 64 with said upper portions axially movable in said barrel, with said intermediate shank portions slidable through said open barrel end 60 and with said hook portions 78 and 80 depending therefrom with said eye forming hook portions 78 and 80 on opposite hemi-cylindrical portions 82 and 84 projecting downwardly from opposite sides of said shank portions 87 and 89 to have their arcuate lower ends 102 and 104 in alignment and their tips 106 and 108 projecting upwardly on opposite sides to provide when assembled a continuous eye loop 74 for the fish hook eye 76.

It is obvious that with this construction when said mounting means 32, comprising said split portions 82 and 84, is moved upwardly to axially raised position, said draw wire may enter into the channel 66 formed by said cutaway portions 94 and 96 of the upper head portions 91 and 93 to cause them to split as shown in Fig. 2 to cause their cylindrical outer surfaces 90 and 92 to frictionally abut the side wall of the barrel 54 to frictionally retain said portions and attached fish hook 18 thereto against swivelling rotation and in raised position, preferably with so little friction that a fish striking the fish hook 18 may pull said portions of said attaching means 32 downwardly under said draw wire 48 to permit said head portions 91 and 93 forming the head 64 to swivel within the lower end of the barrel as indicated at 32 in Figs. 3 and 7 permitting swivelling of said fish hooks. It is also obvious that with this construction said lower hook eye forming portions 78 and 80 may be pivoted outwardly to be split into oppositely disposed hook portions for insertion of a fish hook eye 76 to permit the tilting of the eye of a fish hook first on the hook 106 of one portion as they are split and then on the hook 108 of the other portion of the eye member 70 with said upper end portions 91 and 93 pivoting inwardly on said shoulders 98 and 100 as pivots within the channel 66 formed between them. It is obvious that the fish hook may be removed in reverse fashion.

Fig. 2 illustrates how the draw wire splits the shank portions 87 and 89 slightly so that the cylindrical outer surfaces 90 and 92 of the head portions 91 and 93 may frictionally engage the inner wall of the barrel to retain the parts in locked non-swivelling position. The strike of the fish moves the improved fish hook mounting means from the locked position at 32 to the unlocked position shown at 32.

It is apparent that I have provided a novel type of fishing lure in which the fish hook may be selectively replaced thereon in a novel manner and which may either be set in a swivelling or non-swivelling position, constructed of a minimum number of parts, simple and sure in its action, with the other advantages described above.

It is understood that my invention is not limited to the specific embodiment shown and that various deviations may be made therefrom without departing from the spirit and scope of the appended claims.

What I claim is:

1. A fishing lure, comprising an elongated generally cylindrical fish simulating body, having a hole extending upwardly from the lower portion thereof, a projection projecting inwardly from the upper portion of said hole, a fish hook, and fishhook mounting means swivelly mounted within the lower portion of said hole, having a channel in the upper portion thereof of smaller width than the diameter of said projection, whereby when said mounting means is moved axially upwardly within said hole, said projection fits in said channel and locks said mounting means in non-swivelling position.

2. A fishing lure, comprising an elongated generally cylindrical fish simulating body having a nose and a central axial hole extending from the nose rearwardly centrally of said body to the rear end thereof, and having a vertical hole projecting downwardly therefrom to the lower surface of said body, a draw wire extending through said central axial hole of said body, a hollow cylindrical swivel barrel mounted in said vertical hole, having diametric holes therein at the upper end thereof containing said draw wire and having an inwardly domed lower end having an open central portion, a fish hook, and mounting means for said fish hook having a cylindrical upper portion of a length less than the distance between the lower end of said barrel and said draw wire swivelly mounted within said lower barrel portion, and having a central diametric groove providing resilient arms upstanding from each side of said groove and having fish hook supporting means projecting downwardly therefrom through said open lower domed end of said barrel, whereby when said upper end of said fish hook mounting means is moved upwardly said arms may engage said draw wire to prevent rotation of said fish hook mounting means within said barrel.

3. A fishing lure, comprising an elongated generally cylindrical fish simulating body having a vertical hole projecting downwardly therefrom to the lower surface of said body, a hollow cylindrical swivel barrel rigidly mounted in said vertical hole, said barrel having an inwardly domed lower end with an open central portion, a projection projecting inwardly from the upper end of said cylindrical barrel, a fish hook, mounting means for said fish hook having a cylindrical upper portion of a length less than the distance between the lower end of said barrel and said projection swivelly mounted within said lower barrel portion, and having a central diametric groove providing resilient arms upstanding from each side of said groove and having fish hook supporting means projecting downwardly therefrom through said open lower domed end of said barrel, whereby when said upper end of said fish hook mounting means is moved upwardly, said arms may engage said projection to prevent rotation of said fish hook mounting means within said barrel.

4. A fishing lure, comprising an elongated generally cylindrical fish simulating body having a nose and a central axial hole extending from the nose rearwardly centrally of said body to the rear end thereof, and having a vertical hole projecting downwardly therefrom to the lower surface of said body, a draw wire extending through said central axial hole of said lure and having its ends secured to said lure, a hollow cylindrical swivel barrel mounted in said vertical hole, having diametric holes therein at the upper end thereof containing said draw wire, said barrel having an inwardly domed lower end with an open central portion, a fish hook, mounting means for said fish hook comprising an axially diametrically split fish hook eye receiving eye member, each split half thereof having an enlarged upper head portion, of less height than the distance between the lower end of said barrel and said draw wire, an intermediate shank portion of less width extending through the open domed lower end of said barrel and an eye forming lower hook portion, said upper head portions comprising enlarged hemi-cylindrical portions having flat diametric inner surfaces and hemi-cylindrical outer surfaces each having a diametrically cutaway portion at the upper end thereof extending substantially throughout the length thereof and providing a wire receiving channel, said hook portions being attached to opposite sides of said intermediate shank portions so that the tip of each hook portion lies on opposite sides of said member, said upper head portions thus providing a composite clutch for receiving the draw wire in the channel thereof so that when said upper head portions are moved upwardly within said barrel said draw wire may fit within said channel to prevent said member from rotating within said barrel and whereby a fish may move said upper head portions downwardly below said draw wire to permit swivelling of said upper head portions within said barrel and said oppositely disposed hook portions may be spread outwardly with said upper head portions pivoting inwardly towards each other in said channel to permit separation of said hooks to permit the threading of the eye of said fish hook, first on one eye forming lower hook portion, and then on the other eye forming lower hook portion.

5. A fishing lure, comprising an elongated generally cylindrical fish simulating body having a vertical hole projecting downwardly therefrom to the lower surface of said body, a hollow cylindrical swivel barrel rigidly mounted in said vertical hole, having a domed lower end with an open central portion, a projection projecting inwardly from the upper end of said barrel, a fish hook, mounting means for said fish hook comprising an axially diametrically split fish hook eye receiving eye member, each split half thereof having an enlarged upper head portion of less height than the distance between the lower end of said barrel and said draw wire, an intermediate shank portion of less width extending through the open domed lower end of said barrel and an eye forming lower hook portion, said upper head portions comprising enlarged hemi-cylindrical portions with flat diametric inner surfaces and hemi-cylindrical outer surfaces each having a diametrically cutaway portion at the upper end thereof extending substantially throughout the length thereof, providing a draw wire receiving channel, said hook portions being attached to opposite sides of said intermediate shank portions so that the hook portions are on opposite sides of said eye member relative to each other, said upper head portions thus providing a composite clutch for receiving the draw wire in the channel thereof so that when said upper portions are moved upwardly within said barrel, said draw wire may fit within said channel to prevent said hook members from rotating within said barrel and whereby a fish may move said upper portions downwardly below said draw wire to permit swivelling of said upper portions within said barrel and said oppositely disposed hook portions may be spread outwardly with said upper portions pivoting inwardly towards each other in said channel to permit separation of said hooks to permit the threading of the eye of a fish hook, first on one hook portion and then on the other hook portion.

6. In combination with a lure having a vertical opening, a barrel in said opening, and a diametric passage in said lure for a draw wire, selectively swivelling or non-swivelling mounting means for a fish hook, comprising an axially diametrically transversely split fish hook eye receiving eye member, each split half thereof having an enlarged upper head portion of less height than the distance between the lower end of said barrel and said draw wire, an intermediate shank portion of less width reciprocable through the open domed lower end of said barrel and an eye forming lower hook portion, said upper head portions comprising enlarged hemi-cylindrical portions having flat diametric inner surfaces and hemi-cylindrical outer surfaces each with a diametrically cutaway portion at the upper end thereof extending substantially throughout the length thereof, providing a draw wire receiving channel, said hook portions being attached to opposite sides of said intermediate portions so that the hook portion tips are oppositely directed, said upper portions thus providing a composite clutch for receiving the draw wire in the channel thereof so that when said upper portions are moved upwardly within said barrel said draw wire may fit within said channel to prevent said hook portions from rotating within said barrel and whereby a fish may move said upper portions downwardly below said draw wire to permit swivelling of said upper portions within said barrel and whereby said oppositely disposed hook portions may be spread outwardly with said upper portions pivoting inwardly towards each other in said channel to permit separation of said hook portions to permit the threading of the eye of a fish hook, first on one hook portion and then on the other hook portions.

7. In combination with a lure having a vertical opening, a barrel in said opening having a domed open lower end and a diametric hole in its upper end for receiving a lure draw wire, a selectively swivelling or non-swivelling mounting means axially movable in said barrel, said mounting means comprising split hemi-cylindrical head portions having flat diametric inner surfaces and hemi-cylindrical outer surfaces each with an upper locking clutch plate portion, and a diametrically cutaway portion centrally of the upper end substantially throughout the length thereof, an intermediate shank portion projecting downwardly through the open lower domed end of the barrel forming a shoulder between said upper and intermediate portions, and an eye forming hook on the lower end thereof, said hemi-cylindrical head portions having their flat diametric inner surfaces abutting to substantially provide a cylinder with said upper portions axially slidable in said barrel with said intermediate portions slidable through said lower open barrel end, with said hook portions depending therefrom, with the eye forming hook portions of opposite hemi-cylindrical portions projecting downwardly from opposite sides to have their arcuate lower ends in alignment and their tips projecting upwardly in opposite directions to provide when assembled a continuous eye loop for the fish hook eye, whereby when in axially raised position said draw wire may enter into the channel provided between said head portions to cause them to spread to frictionally abut the side wall of the barrel to retain said portions and attached fish hook against rotation and in raised position, with so little friction that a fish biting the fish hook may pull said head portions downwardly under said draw wire to permit said head portions to swivel within the lower end of the barrel, and whereby said lower hook eye forming portions may be pivoted outwardly to be spread into oppositely disposed hook portions for insertion or withdrawal of a fish hook, with said head portions pivoting inwardly within the channel formed between them.

8. In a fishing lure, an elongated fish simulating body having a central axial passageway therethrough and a vertical opening in the lower portion of said body communicating with said passageway, a fish hook mounting in said vertical opening, said mounting including a hollow cylindrical barrel, and a depending hook holding element having a cylindrical upper portion retained within said barrel and slidably and swivelly positioned in the lower part of said barrel, said barrel having diametrically opposite openings in alignment with said central axial passageway, a wire extending through said passageway and said openings, said upper cylindrical portion having a cut away portion engageable with said wire when said upper cylindrical portion is moved upwards, whereby the depending hook holding element is releasably locked in non-swivelling relation to the body.

ROBERT B. POND.

REFERENCES CITED

The following references are of record in the file of this patent:

UNITED STATES PATENTS

| Number | Name | Date |
| --- | --- | --- |
| 463,032 | Eichelberger | Nov. 10, 1891 |
| 1,299,432 | Dickens | Apr. 8, 1919 |
| 1,468,148 | Gaess | Sept. 18, 1923 |
| 2,172,889 | Niemi | Sept. 12, 1939 |
| 2,239,404 | Slepica | Apr. 22, 1941 |
| 2,254,949 | Messacar | Sept. 2, 1941 |